Jan. 27, 1959
J. M. PARKS, JR
2,870,773
DENTAL FLOSS DISPENSER
Filed April 17, 1957
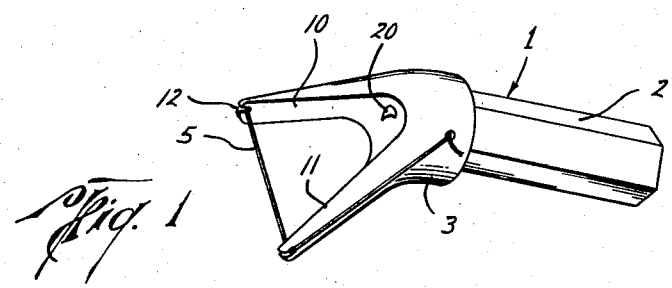
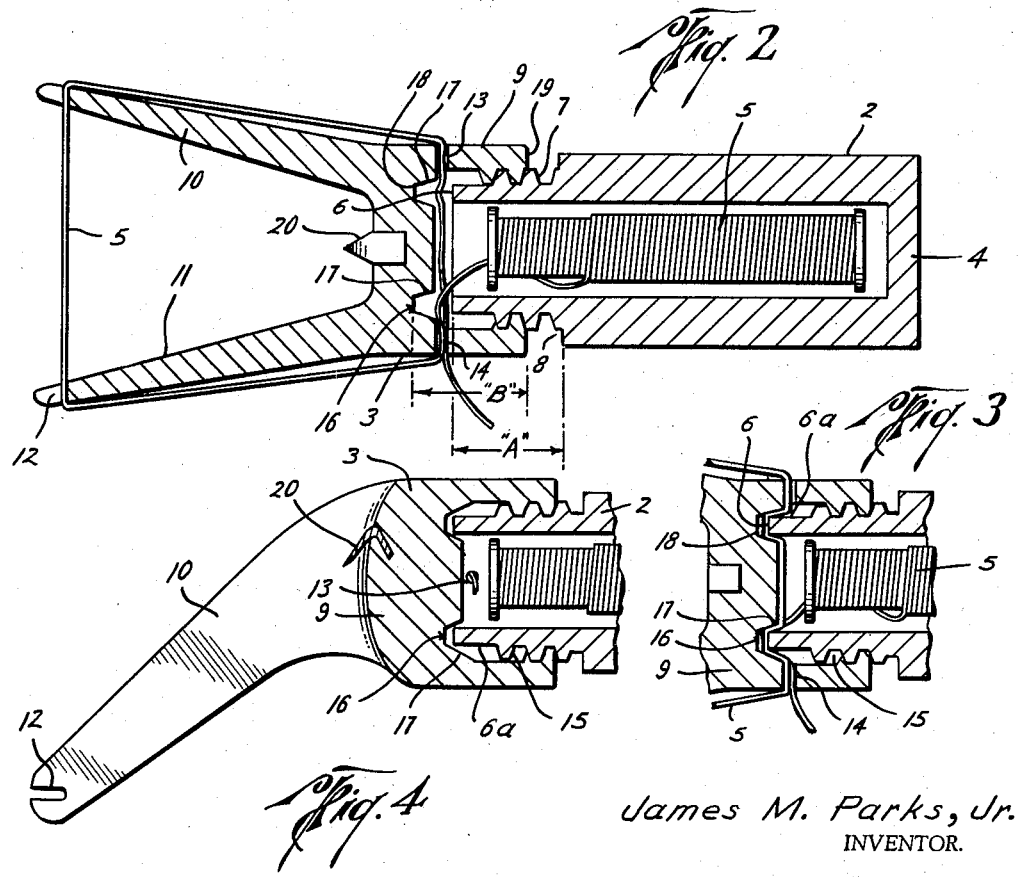
James M. Parks, Jr.
INVENTOR.
BY Arnold and Stidham
ATTORNEYS

United States Patent Office 2,870,773
Patented Jan. 27, 1959

2,870,773

DENTAL FLOSS DISPENSER

James M. Parks, Jr., Houston, Tex.

Application April 17, 1957, Serial No. 653,421

2 Claims. (Cl. 132—92)

This invention relates to dental floss dispensers and, more particularly, to a dental floss dispenser wherein a length of floss is held under tension and in convenient position for use in dental treatment.

There are now on the market implements of various types designed to hold a short length of dental floss in convenient position for cleaning between the teeth. However, such devices have enjoyed only very limited success because of their inability to maintain tension in the working length of dental floss throughout the cleaning operation. The inability of such devices to keep the dental floss taut may be attributed to the failure of their clamping devices to prevent slippage of the dental floss. Dental floss is by its nature difficult to grip positively, primarily because of its small cross-section and its slippery, treated surface.

It is, therefore, an object of my invention to provide a novel apparatus for holding the length of dental floss securely under tension but which will readily and easily release the floss for feeding a clean and sanitary length thereof into working position.

It is a further object of my invention to provide improved apparatus having a minimum of parts easily operated to hold a length of floss bridged between two arms in a taut condition so that it will not slip.

It is a further object of my invention to provide a combination holder and dispenser for a supply of dental floss, the dispenser being part of the holder and constituting a handle or grip therefor.

It is a further object of my invention to provide a dental floss holder that is easy to operate and simple and economical to manufacture.

In my dental floss dispenser a length of dental floss is extended across a bridge formed by two forked members, the length of floss being positively guided to insure proper disposition. With the length of dental floss in position, both ends of the working piece of dental floss are clamped securely between the holder and the dispenser-handle. An annular protrusion is provided in one of the aforesaid members and an annular cooperating groove in the other. The groove is provided with a wedge-like profile which grips positively the dental floss and prevents any slippage thereof.

Further objects and advantages of my invention will appear more fully from the following description when read in connection with accompanying drawings in which:

Fig. 1 is a view in perspective of my invention;

Fig. 2 is a top elevation, in partial cross-section, of my invention;

Fig. 3 is a top partial section view of my invention; and

Fig. 4 is another partial section view of my invention.

Referring now to the drawings I have disclosed my dental floss holder and dispenser 1 consisting of two basic parts, a hollow dispenser-handle 2 and a holder 3. While, of course, I am not limited to the use of any specific material, I have found that both parts, the handle and the holder, can be mass produced inexpensively by injection molding of plastics or the like. One end of the handle 2 is closed at 4 to provide a container for a conventional roll of dental floss 5. The other end of the handle 2 is open providing an annular clamping surface 6. External threads 7 terminating in a thread stop shoulder 8 are provided near the open end of the handle 2 for engagement thereof with the holder 3 as hereinafter described.

The holder element 3 includes a cap portion 9 and a pair of divergent arms 10 and 11. At the end of each arm is a slot 12 which functions to guide and hold a length of dental floss disposed to bridge the space between arms 10 and 11. On diametrically opposite sides of cap 9 are small guide holes 13 and 14 which permit passage of dental floss from the hollow interior of my tool to the outside thereof. Within the cap 9 are internal threads 15 which cooperate with external threads 7 on the handle 2 to permit assembly of the handle and holder portions of my tool into a unitary, workable device. In axial alignment with the annular clamping surface 6 on the handle 2 and equal in diameter thereto, is an annular groove 16 formed at the end of the internal threads within the cap portion 9. The side walls 17 of this groove are sloped inwardly to present at each side of the annular groove a pair of wedge-like surfaces adapted to cooperate with the clamping surface 6 and the portions 6a adjacent thereto. The bottom 18 of annular groove is narrower than clamping surface 6 so that the side walls 17 constitute the bearing surfaces. It is a further feature of my invention that the dimension "A" reflecting the distance from shoulder 8 to the clamping surface 6 is greater than the depth "B" of the bottom 18 of annular groove 16 measured from the bottom 19 of cap portion 9. Thus, when the threads 7 and 15 are tightly engaged substantially all axial thrust created thereby is carried between clamping surfaces 6 and 6a and the side walls 17 of annular groove 16 and regardless of how tightly the threads are engaged, no axial thrust will be taken up by the shoulder 8 and the bottom 19 of cap portion 9. Of course, the clamping action is not dependent solely upon axial pressure as in the case of face to face surface engagement wherein the surfaces must be smooth and parallel to function properly. Instead, I achieve a wedging action against the sloping sides 17 of the groove which may be cast as an integral part of the head without further machining.

As an additional feature of my invention I provide a small metal cut-off tab or knife 20 partially embedded into cap 9.

In operation of my device the roll of dental floss 5 is placed in the cavity of handle 2 and the free end of the dental floss is passed through the open end thereof and out through hole 13 to the outside of the cap portion. The length of dental floss 5 is then carried through the slots 12 in arms 10 and 11 to bridge the space between said arms. The end of the length of floss 5 is inserted through guide hole 14 from outside to inside, carried across the threaded opening on cap portion 9 and pulled out through guide hole 13. The container-handle 2 is then threaded tightly into cap 9 while the opposite ends of the working segment of dental floss protruding from guide hole 14 are held to provide some tension in the floss. When the container-handle 2 is screwed all the way into the cap, the bearing surfaces 6 and 6a of the annular opening press into the annular groove 16 in the cap to take up a bight in the dental floss at each contact with the cooperating clamping surfaces to increase the tension of the working portion thereof. At the same time, the annular bearing surface 6 and adjacent areas 6a wedge against the inner and outer sloping surfaces to increase the clamping pressure in accordance with the recognized principle of the wedge and to present a positive gripping action with the dental floss therebetween.

To change to a new working segment of dental floss, the container-handle is unscrewed slightly to unclamp the dental floss and the free end of the dental floss is pulled until a fresh segment thereof appears between the two arms 10 and 11. The container-handle is again screwed tightly into the cap to clamp the fresh segment of dental floss. The excess dental floss at the free end may be cut off on the metal cut-off tab 20.

It will, of course, be understood that various changes may be made in the form, details, arrangement and proportion of the parts without departing from the scope of the invention as covered by the appended claims.

Having described my invention I claim:

1. In a tooth cleaning device comprising an elongate hollow handle adapted to receive a roll of dental floss, a holder in releasable threaded engagement with said handle, and a pair of spaced arms on said holder having means thereon for receiving a length of dental floss extended therebetween, the improvement in said tooth cleaning device of means for holding said dental floss securely in tension across said arms comprising an annular clamping surface on said handle, a circular groove in said holder adapted to receive said clamping surface during threaded engagement of said holder and said handle, the walls of said annular groove sloping inwardly toward the bottom thereof, said bottom being narrower than the width of said clamping surface whereby said clamping surface is in wedging engagement with said sloping walls during threaded engagement of said handle and said holder, and guide means for directing said dental floss across said clamping surface toward one of said spaced arms and from the other of said spaced arms back across the clamping surface.

2. In a tooth cleaning device comprising an elongate hollow handle adapted to receive a roll of dental floss, a holder, a pair of spaced arms on said holder having means thereon for receiving a length of floss extended therebetween, and a threaded connection releasably joining said holder and said handle, the improvement in said tooth cleaning device of means for holding said dental floss securely in tension between said spaced arms comprising an annular clamping surface on said handle, a circular groove in said holder adapted to receive said clamping surface during threaded engagement of said holder and said handle, the walls of said annular groove sloping inwardly toward the bottom thereof, said bottom being narrower than the width of said clamping surface whereby said clamping surface is wedged against said sloping walls during engagement of said threaded connection, said threaded connection being of axial extent greater than that necessary to move said clamping surface into contact with the sloping walls of said annular groove, and guide means for directing said dental floss across said clamping surface toward one of said spaced arms and from the other of said spaced arms back across the clamping surface.

References Cited in the file of this patent
UNITED STATES PATENTS

| | | |
|---|---|---|
| 1,239,633 | Stickler | Sept. 11, 1917 |
| 1,442,380 | Ball | Jan. 16, 1923 |
| 1,468,942 | Gamble | Sept. 25, 1923 |
| 1,588,307 | Cammack | June 8, 1926 |
| 1,623,231 | Bowling et al. | Apr. 5, 1927 |
| 1,952,358 | Bohm | Mar. 27, 1934 |